United States Patent [19]
Derian

[11] Patent Number: 5,935,633
[45] Date of Patent: Aug. 10, 1999

[54] DRY POWDERED CHEESE COMPOSITIONS AND PROCESS OF MAKING

[75] Inventor: Robert A. Derian, Collierville, Tenn.

[73] Assignee: Kraft Foods, Inc., Northfield, Ill.

[21] Appl. No.: 08/663,522

[22] Filed: Jun. 13, 1996

[51] Int. Cl.$^6$ .............................. A23C 1/04; A23C 19/086
[52] U.S. Cl. ........................... 426/582; 426/518; 426/573; 426/585
[58] Field of Search ..................................... 426/582, 585, 426/573, 518

[56] References Cited

U.S. PATENT DOCUMENTS

| | | | |
|---|---|---|---|
| 3,741,774 | 6/1973 | Burwell | 426/582 |
| 4,552,774 | 11/1985 | Gronfor | 426/582 |
| 4,594,255 | 6/1986 | Wilson et al. | 426/582 |
| 5,250,316 | 10/1993 | Harris | 426/582 |

*Primary Examiner*—Helen Pratt
*Attorney, Agent, or Firm*—Fitch, Even, Tabin & Flannery

[57] ABSTRACT

The present invention provides a dry powdered cheese composition which may be reconstituted with water to provide a cheese product which has the appearance, flavor, texture, meltability, mouthfeel and bite of natural cheese comprising:

(a) one or more dehydrated cheese powders;
(b) a cold-water swelling starch;
(c) a calcium-containing agent;
(d) one or more salts;
(e) one or more flavoring agents; and
(f) vegetable oil.

The composition has a moisture level which is less than about 3.5%, remains microbiologically stable, has a shelf life of at least 7 months and requires no refrigeration prior to reconstitution with water. The present invention also provides a cheese product produced from this cheese composition.

14 Claims, No Drawings

DRY POWDERED CHEESE COMPOSITIONS AND PROCESS OF MAKING

BACKGROUND OF THE INVENTION

1. Field of the Invention

The present invention generally relates to dry powdered cheese compositions for producing an instant cheese, and more particularly pertains to dry powdered cheese compositions which can be reconstituted with water to provide cheese products which have the characteristics of natural cheeses, and to processes for preparing the dry powdered cheese compositions and cheese products.

2. Background and Description of Related Art a. Food Industry Practices

The food industry has used natural cheeses in many food products. Natural cheeses which have been used historically by the food industry in various food products have disadvantages associated with them. These disadvantages have been overcome by the instant cheese compositions of the present invention.

Those cheese-containing food products which require a cheese "curd" or shape use natural cheeses, which must be refrigerated, and which tend to "oil off" and soften if left at room temperature for a period of time. In contrast, the cheese products of the present invention retain their cheeselike consistency without "oiling off" or softening when left at room temperature for a period of time. The cheese products of the present invention are also more cost effective in comparison with natural cheeses. Further, unlike natural cheeses, the dry powdered cheese compositions of the present invention require no refrigeration before reconstitution with water. They also have a longer shelf life, and lower the risk of microbial attack while in storage, in comparison with natural cheeses. Finally, the powdered compositions of the present invention are suitable for shipment to countries or regions which lack adequate refrigeration facilities. The powdered compositions may then be reconstituted with water at the time of use to provide a cheese composition which resembles a natural cheese.

Historically, cheese powders have been used mainly in snack seasoning applications, in free-flowing fillings and in smooth sauces, and have been used to mimic only the flavor of natural cheeses and not any of the other attributes of natural cheeses. In contrast, the compositions of the present invention may be reconstituted with water to provide cheese products which have the appearance, flavor, texture, meltability, mouthfeel and bite of the corresponding full-moisture, natural cheese. Thus, the compositions of the present invention are different from known cheese powders.

b. Description of the Related Art

Each of the documents described hereinbelow discloses instant cheese compositions, cheese products and/or processes which are different from the instant cheese compositions, simulated cheese products and processes of the present invention. Thus, the instant cheese compositions, simulated cheese products and processes of the present invention are distinct from that which has been described in the art.

U.S. Pat. No. 4,031,254 discloses a cheese product which uses an alkali metal or alkaline earth metal salt, oxide or hydroxide congealing agent. The composition has a moisture content of <10% by weight, and the pH of the composition may be adjusted in order that, upon reconstitution with water, it is between 4.5 and 6.6. Unlike the dry powdered cheese compositions of the present invention, the cheese product described in this patent requires the addition of an alkali metal or alkaline earth metal salt, oxide or hydroxide congealing agent. Further, nothing in this patent states that the cheese product has the appearance, flavor, texture, meltability, mouthfeel or bite of the corresponding natural cheese.

U.S. Pat. No. 4,695,475 discloses imitation cheese products containing high amylose starch as total caseinate replacement.

U.S. Pat. No. 4,937,091 discloses imitation cheeses containing enzymatically debranched starches in lieu of caseinates.

Swiss Patent No. 598768 discloses a cheese product which is made by grating cheese and melting the gratings to eliminate all harmful bacteria. The pasteurized cheese is solidified, grated again, mixed with a salad sauce and flowed into small packages of determined weight.

K. W. Gutknecht, "Cheese-Fast and Easy," *Utah Science* 52(4), 167 (1992), describes an instant Feta cheese which is made from a premix which contains bacteria, enzymes and dried milk, and which requires water and some basic processing in order to make the Feta cheese. This publication states that the Feta cheese produced from the premix and water has the appearance, flavor, texture, meltability, mouthfeel or bite of natural Feta cheese.

S. Bayoumi, "Manufacture of Instant Cheese Powder," *Egyptian Journal of Dairy Science* 19(1), 169–173 (1991), discloses a dried ultrafiltration retentate with 98.14% total solids, 47.13% fat, 34.0% protein and 13% lactose which was used in the preparation of a dried cheese base composed of 250 g of dried retentate, 20 g of NaCl and 2 g of $CaCl_2$ with and without 0.15 g of dried rennet. Difficulties were encountered in making cheese from the mixture made with the dried rennet.

SUMMARY OF THE INVENTION

The present invention provides a dry powdered cheese composition which may be reconstituted with water to provide a cheese product which has the appearance, flavor, texture, meltability, mouthfeel and bite of natural cheese comprising:

(a) one or more dehydrated cheese powders;
(b) a cold-water swelling starch;
(c) a calcium-containing agent;
(d) one or more salts;
(e) one or more flavoring agents; and
(f) vegetable shortening;

the composition has a moisture level which is less than about 3.5%, the composition remaining microbiologically stable, the composition has a shelf life of at least 7 months and requires no refrigeration prior to reconstitution with water. The composition does not become oily or soft at room temperature after reconstitution with water.

The present invention also provides a method for making a cheese product which has the appearance, flavor, texture, meltability, mouthfeel and bite of natural cheese comprising:

(1) mixing an amount of water which is from about 20% to about 50% of the total weight percent of the reconstituted cheese product with an amount of a dry powdered cheese composition which is from about 50% to about 80% of the total weight percent of the cheese product, wherein the powdered cheese composition comprises:

(a) one or more dehydrated cheese powders;
(b) a cold-water swelling starch;
(c) a calcium-containing agent;

(d) one or more salts;
(e) one or more flavoring agents; and
(f) vegetable shortening;
(2) allowing the product resulting from step (1) to stand at a temperature of from about 140° F. to about 100° F. for a period of from about 1 minute to about 10 minutes.

DETAILED DESCRIPTION OF THE INVENTION

In one aspect, the present invention provides a dry powdered cheese composition which may be reconstituted with water to provide a cheese product which has the appearance, flavor, texture, meltability, mouthfeel and bite of natural cheese comprising:
(a) one or more dehydrated cheese powders;
(b) a cold-water swelling starch;
(c) a calcium-containing agent;
(d) one or more salts;
(e) one or more flavoring agents; and
(f) vegetable shortening.
The composition has a moisture level which is less than about 3.5%. The composition has a shelf life of at least 7 months and requires no refrigeration prior to reconstitution with water. The composition does not become oily or soft at room temperature after reconstitution with water.

In another aspect, the present invention provides a method for making a cheese product which has the appearance, flavor, texture, meltability, mouthfeel and bite of natural cheese. The method comprises the steps of:
(1) mixing an amount of water which is from about 20% to about 50% of the total weight percent of the cheese product with an amount of a dry powdered cheese composition which is from about 50% to about 80% of the total weight percent of the cheese product, wherein the dry powdered cheese composition comprises:
(a) one or more dehydrated cheese powders;
(b) a cold-water swelling starch;
(c) a calcium-containing agent;
(d) one or more salts;
(e) one or more flavoring agents; and
(f) vegetable shortening;
allowing the product resulting from step (1) to stand at a temperature of from about 140° F. to about 100° F. for a period of from about 1 minute to about 10 minutes.

Specific dry powdered cheese compositions and cheese products within the scope of the invention include, but are not limited to, the dry powdered cheese compositions and cheese products discussed in the examples presented hereinbelow.

Contemplated equivalents of the dry powdered cheese compositions and cheese products described herein include cheese compositions and cheese products which otherwise correspond thereto, and which have the same general properties thereof, wherein one or more simple variations are made which do not adversely affect the compositions or products.

The dry powdered cheese compositions of the present invention generally contain the ingredients described hereinbelow, and the weight percents thereof described hereinbelow, based upon the total dry weight of the compositions.

Any dehydrated cheese powder may be employed in the instant cheese compositions of the present invention. The dehydrated cheese powders have less than about 3.5% of moisture. Dehydrated cheese powders which may be employed in the instant cheese compositions of the present invention include, but are not limited to, Anejo Enchilado Cheese Powder 73870, Monterey Jack Cheese Powder 9497, Mozzarella Zing Cheese Powder 9498, Swiss Zing Cheese Powder 9481, Cotija Cheese Powder 73401, Parmtang Cheese Powder 9335, Romano Tang Cheese Powder 9381, Sharpee for Baking Cheese Powder 9510, Panela Cheese Powder 73397, Hexagon Cheese Powder 9483, Cotija with Jalapeno Cheese Powder 73857 and Cuatro Queso Cheese Powder 73856.

One or more different dehydrated cheese powders may be present in the instant cheese compositions of the present invention.

The total amount of the dehydrated cheese powders present in the dry powdered compositions of the present invention is generally from about 45% to about 55% of the total weight percent of the dry powdered compositions.

Anejo Enchilado Cheese Powder 73870 is a cheese powder product made by spray drying natural Anejo Enchilado cheese. This cheese powder acts together with Monterey Jack Cheese Powder 9497, Mozzarella Zing Cheese Powder 9498 and Swiss Zing Cheese Powder 9481 to mimic the flavor of the full-moisture, natural Anejo Enchilado cheese.

Monterey Jack Cheese Powder 9497 is a cheese powder product made by spray drying natural Monterey Jack cheese.

Mozzarella Zing Cheese Powder 9498 is a cheese powder product made by spray drying natural Mozzarella cheese.

Swiss Zing Cheese Powder 9481 is a cheese powder product made by spray drying natural Swiss cheese.

Cotija Cheese Powder 73401 is a cheese powder product made by spray drying natural Cotija cheese. This cheese powder acts together with Parmtang Cheese Powder 9335, Romano Tang Cheese Powder 9381 and Sharpee for Baking Cheese Powder 9510 to mimic the flavor of the full-moisture, natural Cotija cheese.

Parmtang Cheese Powder 9335 is a cheese powder product made by spray drying natural Parmesan cheese.

Romano Tang Cheese Powder 9381 is a cheese powder product made by spray drying natural Romano cheese.

Sharpee for Baking Cheese Powder 9510 is a cheese powder product made by spray drying natural Cheddar cheese.

Panela Cheese Powder 73397 is a cheese powder product made by spray drying natural Panela cheese. This cheese powder acts together with Hexagon Cheese Powder 9483, Monterey Jack Cheese Powder 9497 and Mozzarella Zing Cheese Powder 9498 to mimic the flavor of the full-moisture, natural Panela cheese.

Hexagon Cheese Powder 9483 is a cheese powder product made by spray drying a blend of natural Granular and Blue cheeses.

Cotija with Jalapeno Cheese Powder 73857 is a cheese powder product made by spray drying natural Cotija cheese and adding jalapenos. This cheese powder acts together with Parmtang Cheese Powder 9335, Romano Tang Cheese Powder 9381 and Sharpee for Baking Cheese Powder 9510 to mimic the flavor of the full-moisture, natural Cotija with Jalapeno cheese.

Cuatro Queso Cheese Powder 73856 is a cheese powder product made by spray drying the following four natural cheeses: Panela cheese, Anejo Enchilado cheese, Cotija cheese and Monterey Jack cheese. This cheese powder acts together with Swiss Zing Cheese Powder 9481, Monterey Jack Cheese Powder 9497 and Mozzarella Zing Cheese Powder 9498 to mimic the flavor of a blend of the four cheeses described above.

The cheese powders and numbers described above are the commercial names for cheese powders made by Kraft Food Ingredients, a division of Kraft Foods, Inc.

The cold-water swelling starch, in combination with the anti-caking and binding agent, provides a "squeaky" bite and texture to the cheese products of the present invention. The relative amounts of cold-water swelling starch and anti-caking and binding agents may be varied in order to provide a wide range of textures to these cheese products, from crumbly, as with Feta cheese, to hard, as with Parmesan cheese.

Any cold-water swelling starch may be employed in the instant cheese compositions of the present invention. Cold-water swelling starches which may be employed in the instant cheese compositions of the present invention include, but are not limited to, Ultratex A, Ultratex 1, Ultratex 2, Ultratex 3, Ultratex 4, Ultrasperse M, Ultrasperse 5 and Ultrasperse A. Each of these cold-water swelling starches is available from National Starch Co.

The cold-water swelling starches are generally present in the dry powered compositions of the present invention in the range of from about 15% to about 20% of the total weight percent of the dry powdered compositions, and are preferably present in the range of from about 16% to about 18% of the total weight percent of the compositions.

Ultrasperse M is a cold-water swelling, instant starch that is more easily dispersed, and that offers better texture and freeze thaw stability, than most other cold-water swelling starches in this type of application. It also offers the advantage over other cold-water swelling starches of increased resistance to extremely harsh processing conditions, such as intense heating, high shear and low pH.

Calcium-containing agents function in the instant cheese compositions of the present invention to maintain the texture of the cheese products produced from these instant cheese compositions, as is described in more detail herein below.

Any calcium-containing agent may be employed in the instant cheese compositions of the present invention. Calcium-containing agents which may be employed in the instant cheese compositions of the present invention include, but are not limited to any calcium phosphate, such as tricalcium phosphate. Tricalcium phosphate is also known as calcium phosphate tribasic, hydroxyapatite and calcium hydroxide phosphate.

The calcium-containing agent is generally present in the instant cheese compositions of the present invention in an amount ranging from about 3% to about 5% of the total weight percent of the compositions, and is preferably present in an amount ranging from about 3.5% to about 4.5% of the compositions.

Tricalcium phosphate is a powder used to maintain the texture of the cheese products of the invention in conjunction with the cold-water swelling starch. The tricalcium phosphate prevents the cold-water swelling starch from swelling too much and, thereby, provides these cheese products with a "squeaky" chew.

Salts function in the instant cheese compositions of the present invention to add flavor to the cheese products produced from these compositions after reconstitution with water.

Any salt which imparts a desirable flavor to the cheese products of the invention may be employed in the instant cheese compositions of the invention. Salts which may be employed in the instant cheese compositions of the invention include, but are not limited to sodium chloride and calcium chloride. Flour salt is a finely-milled sodium chloride, which solubilizes more easily than regular table salt.

The total presence of the salts which are present in the dry powdered cheese compositions of the present invention generally ranges from about 1% to about 3% of the total weight percent of the dry powdered compositions, and preferably ranges from about 1% to about 2% of the total weight percent of the compositions.

Flavoring agents may optionally be present in the cheese compositions of the invention. The flavoring agents function in the instant cheese compositions of the present invention to provide the imitation flavors of the corresponding natural, full-moisture cheeses to the cheese products of the present invention which are produced from these instant cheese compositions.

Any flavoring agent which is edible, and which imparts an imitation cheese flavor to the cheese products of the present invention may be employed in the instant cheese compositions of the present invention. Flavoring agents which may be employed in the instant cheese compositions of the present invention include, but are not limited to, citric acid, lactic acid, powdered cream, powdered butterfat and various proprietary flavoring materials.

The total presence of the flavoring agents in the dry powdered cheese compositions of the present invention generally ranges from 0% to about 8% of the total weight percent of the dry powdered compositions, and preferably ranges from about 2% to about 20% of the total weight percent of the compositions.

Citric acid is a water-soluble, powdered product which provides a sharp acidic taste to cheese products within the invention, such as that of the Anejo Enchilado, Cotija and Cotija with Jalapeno cheese products of the invention. These cheese products correspond to the full-moisture, natural cheese products of Anejo Enchilado cheese, Cotija cheese and Cotija with Jalapeno cheese, each of which normally has a sharp, acidic "bite" to it.

Cream plus is a spray-dried, water-soluble, powdered product which is made from fresh cream, and which supplies a dairy flavor and dairy richness to cheese products within the present invention.

Lactic acid and citric acid are water-soluble, powdered products used to mimic the same sharp, acidic bite normally found in certain natural cheeses, such as Cotija cheese.

HC uncolored is a spray-dried, water-soluble, powdered product made from butterfat which supplies a buttery flavor to cheese products within the present invention.

Vegetable shortenings have the function of providing a desirable "mouthfeel" to cheese products of the present invention produced from the powdered compositions of the present invention. The vegetable shortening also functions to bind the powdered cheese and other dry ingredients.

The vegetable shortening is a partially hydrogenated vegetable oil which has a firmness similar to that of soft margarine. The vegetable oil may be any of the commonly used vegetable oils, such as soybean oil, cottonseed oil, corn oil, olive oil, safflower oil and peanut oil.

The vegetable shortenings are generally present in the range of from about 10% to about 20% of the total weight percent of the powdered compositions, and preferably are present in the range of from about 12% to about 17% of the total weight percent of the compositions.

Anti-caking and binding agents along with cold water swelling starch function to prevent the powdered compositions of the present invention from caking prior to rehydration with water, and also to bind the ingredients of the powdered products of the present invention together after rehydration.

A preferred anti-caking and binding agent which may, optionally, be employed in the powdered compositions of the present invention is microcrystalline cellulose.

When present in the powdered cheese compositions of the present invention, the anti-caking and binding agents are generally present in the range of from about 1.5% to about 5% of the total weight percent of the powdered compositions, and preferably are present in the range of from about 2% to about 3% of the total weight percent of the compositions.

The anti-caking and binding agent, in combination with a cold-water swelling starch, provides a "squeaky" bite and texture to cheese products within the present invention. The relative amounts of the anti-caking and binding agent and cold water swelling starch may be varied in order to provide a wide range of texture to cheese products within the present invention, from crumbly, as with Feta cheese, to hard, as with Parmesan cheese.

Examples of cheese products which may be produced in accordance with the present invention include, but are not limited to, those which correspond to full-moisture, natural Anejo Enchilado cheese, Monterey Jack cheese, Mozzarella cheese, Swiss cheese, Cotija cheese, Parmtang cheese, Romano cheese, Sharpee cheese, Panela cheese, Hexagon cheese, Jalapeno cheese, Cotija with Jalapeno cheese, Cuatro Queso cheese, Blue cheese, Brick cheese, Cheddar cheese, Jack cheese or Feta cheese, or to combinations of any of the foregoing cheeses.

In the method for preparing the powdered compositions of the invention, the dry ingredients, including the microcrystalline cellulose, if used, are first blended in a suitable mixer, such as a ribbon blender. The vegetable shortening, in the form of a soft plastic solid is then added. Mixing is continued until the vegetable shortening is homogeneously blended with the dry ingredients and powdered consistency, similar to rice flour, is attained.

Once a desired powdered composition has been prepared, it may be reconstituted with water to produce the cheese product of the invention by blending it thoroughly with water which is at a temperature of from about 100° F. to about 140° F. The water ranges from about 20% to about 50% of the total weight percent of the cheese product being produced, and preferably ranges from about 26% to about 40% of the total weight percent of the product being produced. The amount of the powdered composition which is blended with water generally ranges from about 40% to about 80% of the total weight percent of the cheese product being produced and preferably ranges from about 60% to about 75% of the total weight percent of the cheese product being produced.

The cheese product, after being reconstituted with water, resembles fresh natural cheese curd after the whey draining step. The cheese product can be immediately used as a topping for food products, such as tacos, pizza and enchiladas. Alternatively, the cheese product can be pressed to provide a block of cheese which can be sliced or grated.

While the various aspects of the present invention are described herein with some particularity, those of skill in the art will recognize numerous modifications and variations which remain within the spirit of the invention. These modifications and variations are within the scope of the invention as described and claimed herein.

The following examples describe and illustrate the methods for the preparation of the powdered compositions and cheese products of the present invention, as well as other aspects of the present invention, and the results achieved thereby, in further detail. These examples are intended to be merely illustrative of the present invention, and not limiting thereof in either scope or spirit.

In the examples, all parts are by weight unless otherwise indicated.

EXAMPLE 1

Preparation of Anejo Enchilado Instant Cheese Composition and Cheese Product—

In this example, an Anejo Enchilado instant cheese composition and an Anejo Enchilado cheese product were prepared. The ingredients, and quantities thereof, which were employed to make this composition and this product are as follows:

| Ingredients | Wt. % of the total components in the cheese product |
|---|---|
| Anejo Enchilado Cheese Powder 73870 | 20.8 |
| Monterey Jack Cheese Powder 9497 | 3.9 |
| Mozzarella Zing Cheese Powder 9498 | 3.9 |
| Swiss Zing Cheese Powder 9481 | 3.4 |
| Salt | 2.2 |
| Citric Acid | 0.6 |
| Cream Plus | 3.8 |
| Ultrasperse M™ (cold water swelling starch) | 14.9 |
| Vegetable shortening (partially hydrogenated soybean oil) | 5.1 |
| Calcium Phosphate tribasic | 2.4 |
| Total (Dry) | 60.7 |
| Water Added | 39.3 |
| Total (Wet) | 100.0% |

All of the dry ingredients were added to a Hobart™ planetary mixer. The mixer was operated on low speed for two minutes to provide a homogeneous dry ingredient mixture. The vegetable shortening was added and mixing was continued on low speed for 5 minutes. At this time, a powdered consistency having a particle size similar to rice flour was attained.

The resulting powdered cheese composition (154.42 g) was then reconstituted with 101.00 g of water by adding the water to the powdered cheese composition in the mixer. The mixer was operated on low speed for 3 minutes to provide cheese curds which resembled natural cheese curd.

EXAMPLE 2

Preparation of Cotija Instant Cheese Composition and Cheese Product—

In this example, a Cotija cheese product was prepared. The ingredients, and quantities thereof, which were employed to make this composition and this product are as follows:

| Ingredients | Wt. % of the total components in the cheese product |
|---|---|
| Cotija Cheese Powder 734091 | 27.5 |
| Parmtang Cheese Powder 9335 | 3.0 |
| Romano Tang Cheese Powder 9381 | 2.8 |
| Sharpee for Baking Cheese Powder 9481 | 4.2 |
| Flour Salt | 2.0 |
| Citric Acid | 0.2 |
| Cream Plus | 1.9 |
| Ultrasperse M™ (cold water swelling starch) | 12.5 |
| Vegetable shortening (partially hy- | 12.0 |

-continued

| Ingredients | Wt. % of the total components in the cheese product |
|---|---|
| drogenated soybean oil) | |
| Calcium Phosphate tribasic | 2.8 |
| Avicel™ (Microcrystalline cellulose) | 2.0 |
| Total (Dry) | 72.5 |
| Water Added | 27.5 |
| Total (Wet) | 100.0% |

The powdered cheese composition and the Cotija cheese product was prepared by the method of Example 1.

EXAMPLE 3

Preparation of Panela Instant Cheese Composition and Cheese Product—

In this example, a Panela cheese product was prepared. The ingredients, and quantities thereof, which were employed to make this composition and this product are as follows:

| Ingredients | Wt. % of the total components in the cheese product |
|---|---|
| Panela Cheese Powder 73397 | 24.0 |
| Hexagon Cheese Powder 9483 | 4.7 |
| Monterey Jack Cheese Powder 9497 | 4.4 |
| Mozzarella Zing Cheese Powder 9498 | 4.7 |
| Flour Salt | 2.3 |
| Citric Acid | 1.6 |
| Cream Plus | 2.0 |
| Ultrasperse M™ (cold water swelling starch) | 12.5 |
| Vegetable shortening (partially hydrogenated soybean oil) | 12.0 |
| Calcium Phosphate tribasic | 2.9 |
| Avicel™ (Microcrystalline cellulose) | 2.0 |
| Total (Dry) | 73.1 |
| Water Added | 26.9 |
| Total (Wet) | 100.0% |

The Panela cheese composition was prepared by the method of Example 1.

EXAMPLE 4

Preparation of Cotija with Jalapeno Instant Cheese Composition and Cheese Product—

In this example, a Cotija with Jalapeno cheese product was prepared. The ingredients, and quantities thereof, which were employed to make this composition and this product are as follows:

| Ingredients | Wt. % of the total components in the cheese product |
|---|---|
| Cotija with Jalapeno Cheese Powder 73387 | 27.5 |
| Parmtang Cheese Powder 9335 | 3.0 |
| Romano Tang Cheese Powder 9381 | 2.8 |
| Sharpee for Baking Cheese Powder 9510 | 4.2 |
| Flour Salt | 2.6 |
| Citric Acid | 0.2 |
| Lactic Acid | 1.1 |

-continued

| Ingredients | Wt. % of the total components in the cheese product |
|---|---|
| Cream Plus | 1.9 |
| Ultrasperse M™ (cold water swelling starch) | 12.5 |
| Vegetable shortening (partially hydrogenated soybean oil) | 12.0 |
| Calcium Phosphate tribasic | 2.8 |
| Avicel™ (Microcrystalline cellulose) | 2.0 |
| Total (Dry) | 72.5 |
| Water Added | 27.5 |
| Total (Wet) | 100.0% |

The Cotija with Jalapeno instant cheese composition was prepared by the method of Example 1.

EXAMPLE 5

Preparation of Cuatro Queso Instant Cheese Composition and Cheese Product—

In this example, a Cuatro Queso instant cheese composition and a Cuatro Queso cheese product were prepared. The ingredients, and quantities thereof, which were employed to make this composition and this product are as follows:

| Ingredients | Wt. % of the total components in the cheese product |
|---|---|
| Cuatro Queso Cheese Powder 73856 | 32.6 |
| Swiss Zing 9481 | 3.6 |
| Monterey Jack Cheese Powder 9497 | 3.1 |
| Mozzarella Zing Cheese Powder 9498 | 4.5 |
| Flour Salt | 1.1 |
| Cream Plus | 2.0 |
| Ultrasperse M™ (cold water swelling starch) | 11.6 |
| Vegetable shortening (partially hydrogenated soybean oil) | 10.6 |
| Calcium Phosphate tribasic | 2.5 |
| Total (Dry) | 71.6 |
| Water Added | 28.4 |
| Total (Wet) | 100.0% |

The Cuatro Queso instant cheese composition was prepared by the method of Example 1.

EXAMPLE 6

Preparation of a Cheese Enchilada With Anejo Enchilado, Cotija and Panela Cheese Products—

In this example, a cheese Enchilada was prepared using the Anejo Enchilado, Cotija and Panela cheese products described hereinabove in Examples 1, 2 and 3, respectively. The ingredients employed are as follows:

| Ingredients | Weight (in grams) | % Weight of the total enchilada |
|---|---|---|
| Flour tortilla | 63.16 g | 34.047 |
| Simulated Panela Cheese Product | 46.30 g | 24.958 |
| Simulated Anejo Enchilado Cheese Product | 21.19 g | 11.422 |

| Ingredients | Weight (in grams) | % Weight of the total enchilada |
|---|---|---|
| Simulated Cotija Cheese Product | 7.39 g | 3.984 |
| Onions | 17.25 g | 9.299 |
| Mexican Tomato Sauce | 30.22 g | 16.290 |
| Total | 185.51 g | 100% |

The flour tortilla was brushed with the Mexican tomato sauce. A desired amount of each cheese product in the form of cheese curd was spread onto the flour tortilla. The tortilla was tightly rolled, and its ends were folded under to form a seal. The Mexican tomato sauce was placed over exposed areas of the tortilla. The resulting Enchilada was baked in an oven at a temperature of 350° F. until it was lightly browned.

The Enchilada produced in this example retained its original shape, and had cheese products which mimicked the mouthfeel and flavor of the corresponding full-moisture, natural cheeses when the same Enchilada was prepared using the corresponding full-moisture, natural cheeses in place of the cheese products of the invention.

What is claimed is:

1. A dry powdered composition which may be reconstituted with water to provide a cheese product which has the appearance, flavor, texture, meltability, mouthfeel and bite of natural cheese comprising:
   (a) one or more dehydrated cheese powders;
   (b) a cold-water swelling starch;
   (c) a calcium-containing agent;
   (d) one or more salts;
   (e) one or more flavoring agents; and
   (f) vegetable shortening;
said composition having a shelf life of at least seven months without requiring refrigeration prior to reconstitution with water; said dehydrated cheese powders being present in the range of from about 45% to about 55% of the total weight of the composition, said cold-water swelling starch being present in the range of from about 15% to about 20% of the total weight of the composition, said calcium-containing agent being present in the range of from about 3% to about 5% of the total weight of the composition, said salts being present in the range of from about 1% to about 3% of the total weight of the composition, said flavoring agents being present in the range of from about 2% to about 6% of the total weight of the composition and said vegetable shortening being present at a level of from about 10% to about 20% of the total weight of the composition.

2. The composition of claim 1 which additionally comprises microcrystalline cellulose.

3. The composition of claim 2 wherein said microcrystalline cellulose is present at a level of from about 1.5% to about 5% of the total weight of the composition.

4. The composition of claim 1 wherein said dehydrated cheese powders are spray dried cheese powders derived from a cheese selected from the group consisting of Anejo Enchilado Cheese, Monterey Jack Cheese, Mozzarella Cheese, Swiss Cheese, Cotija Cheese, Parmesan Cheese, Romano Cheese, Cheddar Cheese, Panela Cheese, Blue Cheese, granular curd cheese and mixtures thereof.

5. The composition of claim 1 wherein said calcium-containing agent is calcium phosphate tribasic.

6. The composition of claim 1 wherein said flavoring agents are selected from the group consisting of citric acid, lactic acid, HC uncolored and cream plus.

7. The composition of claim 1 wherein said salt is sodium chloride.

8. A method for making a powdered cheese compositions which can be reconstituted with water to provide a cheese product which resembles natural cheese comprising providing a homogeneous mixture of one or more dehydrated cheese powders, a cold water swelling starch, a calcium containing agent, one or more salts and one or more flavorings, adding a vegetable shortening to said mixture and mixing for a period of time sufficient to incorporate said vegetable shortening into said mixture and to provide a powdered consistency to provide a dry powdered cheese product which can be reconstituted with water to provide a cheese product which resembles natural cheese in curd form; said dehydrated cheese powders being present in the range of from about 45% to about 55% of the total weight of the composition, said cold-water swelling starch being present in the range of from about 15% to about 20% of the total weight of the composition, said calcium-containing agent being present in the range of from about 3% to about 5% of the total weight of the composition, said salts being present in the range of from about 1% to about 3% of the total weight of the composition, said flavoring agents being present in the range of from about 2% to about 6% of the total weight of the composition and said vegetable shortening being present at a level of from about 10% to about 20% of the total weight of the composition.

9. The method of claim 8 wherein said mixture additionally comprises microcrystalline cellulose.

10. The method of claim 9 wherein said microcrystalline cellulose is present at a level of from about 1.5% to about 5% of the total weight of the composition.

11. The method of claim 8 wherein said dehydrated cheese powders spray dried are cheese powders derived from a cheese selected from the group consisting of Anejo Enchilado Cheese, Monterey Jack Cheese, Mozzarella Cheese, Swiss Cheese, Cotija Cheese, Parmesan Cheese, Romano Cheese, Cheddar Cheese, Panela Cheese, Blue Cheese, granular curd cheese and mixtures thereof.

12. The method of claim 8 wherein said calcium-containing agent is calcium phosphate tribasic.

13. The method of claim 8 wherein said flavoring agents are selected from the group consisting of citric acid, lactic acid, HC uncolored and cream plus.

14. The method of claim 8 wherein said salt is sodium chloride.

* * * * *